United States Patent [19]

Chan et al.

[11] Patent Number: 4,808,098
[45] Date of Patent: Feb. 28, 1989

[54] PIPE EXTRUSION DIE WITH A COOLED AND VACUUMED ADDITIONAL MANDREL

[76] Inventors: Harry Chan, 89 Larkin Ave., Markham, Ontario L3P 4R1; Basilio Yi, 35 Hoover Dr., Thornhill, Ontario L3T 5M6, both of Canada

[21] Appl. No.: 168,935

[22] Filed: Mar. 16, 1988

[51] Int. Cl.⁴ .............................................. B29C 47/88
[52] U.S. Cl. ............................... 425/72.1; 264/209.3; 264/211.13; 264/565; 425/133.1; 425/326.1; 425/388; 425/467
[58] Field of Search ............... 425/72.1, 378.1, 380, 425/133.1, 467, 326.1, 388; 264/209.8, 211.13, 564, 565, 571–573, 209.3

[56] References Cited

U.S. PATENT DOCUMENTS

| | | | |
|---|---|---|---|
| 3,907,961 | 9/1975 | Carrow | 264/314 |
| 3,976,414 | 8/1976 | Hegler et al. | 425/131.1 |
| 4,362,488 | 12/1982 | Casals et al. | 425/133.1 X |
| 4,365,948 | 12/1982 | Chaplain | 425/417 |
| 4,462,778 | 7/1984 | Calcagni | 425/133.1 X |
| 4,500,284 | 2/1985 | Lupke | 425/133.1 X |
| 4,510,013 | 4/1985 | Lupke et al. | 156/498 |
| 4,663,107 | 5/1987 | Takada et al. | 264/519 |
| 4,721,594 | 1/1988 | Jarvenkyla | 425/380 X |

*Primary Examiner*—Richard L. Chiesa

[57] ABSTRACT

An extrusion die, particularly for double-walled corrugated thermoplastic pipes, including an extrusion head, a nozzle, two concentric hollow mandrels carrying die lips and an additional cooled and vacuumed mandrel. The vacuum is maintained between the latter and the inner wall of the pipe to prevent retraction of the wall from the mandrel until the wall is set.

1 Claim, 1 Drawing Sheet

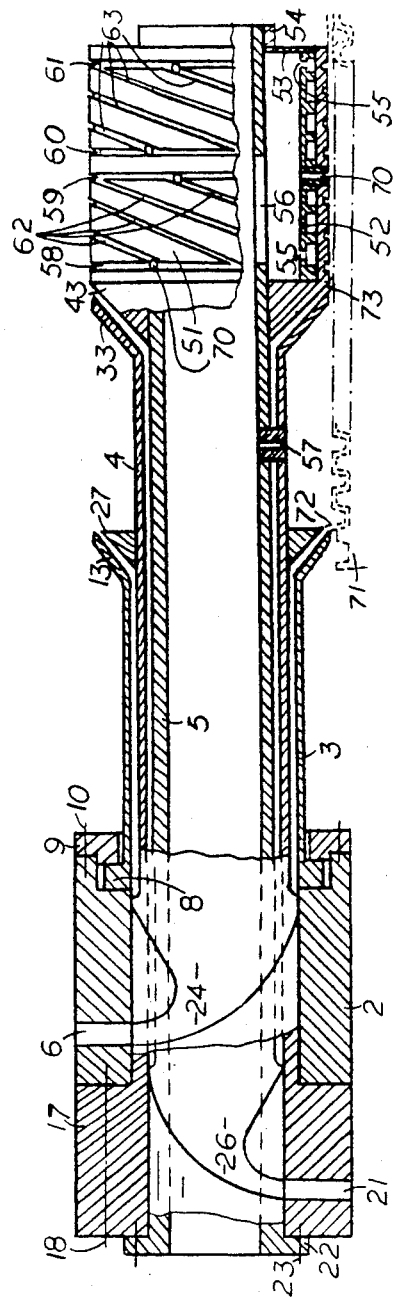

PIPE EXTRUSION DIE WITH A COOLED AND VACUUMED ADDITIONAL MANDREL

BACKGROUND OF THE INVENTION

This invention relates to extrusion dies for apparata producing seamles thermoplastic tubing, particularly double-walled pipes with a smooth inner wall and a corrugated outer wall.

Known dies of such a type (for example U.S. Pat. No. 4,510,013) include the following components:

an extrusion head having a central bore with at least one opening for receiving an extrudate of a thermoplastic material under pressure therefrom;

a nozzle attached to said head and carrying an outer die lip on a free end of the nozzle;

a hollow mandrel placed in said bore in a substantially coaxial relation with and spaced from the nozzle to provide a thermoplastic conducting passage extending in the longitudinal direction thereof for the delivery of the extrudate to the delivery end thereof carrying an inner die lip defining with the outer die lip the annular extrusion orifice of diminishing interior dimensions, through which the extrudate can flow uninterruptedly and form the tubing;

an additional mandrel mounted coaxially with the hollow mandrel, downstream thereof, for urging the tubing outwardly and extracting heat from the latter by means of a plurality of internal channels cooling an outer surface of the additional mandrel receiving the tubing from the extrusion orifice, said channels being connected to a coolant discharge and a coolant supply located exteriorly of the tubing and communicating with said channels through the hollow mandrel.

The apparatus of the above patent works in a blow-molding mode, pressurized air being supplied within the outer tube between the nozzle and the additional mandrel for conforming the tube to a travelling molding cavity, and within the inner tube between the additional mandrel and downstream baffles.

This leads to the following drawbacks:

fusing still unstable and soft inner parison to the already formed outer tube wherein the inner tube turns from a soft to a rigid state;

retraction of the parison from the outer surface of the additional mandrel and drawing the same into the formed corrugations of the outer tube;

nonuniform change of the internal pressure of the inner parison.

These drawbacks cause imperfections of the inner wall, such as shrink marks (depressions of its surface) in the spots of retractions, warpage (caused by said change) and wrinkles having appearance of a wave.

In another known apparatus (for example, U.S. Pat. No. 3,976,414, FIG. 2) working in a vacuum-molding mode with negative pressure applied exteriorly to the outer tube to draw the latter into a travelling molding cavity, the inner tube is under positive internal air pressure. Herein since the additional mandrel is not cooled, the above imperfections are more apparent.

SUMMARY OF THE INVENTION

The objective of the present invention is to eliminate the above drawbacks of the known dies. For this, the additional mandrel has a plurality of grooves on its outer surface, the grooves being connected to a vacuum source located exteriorly of the tubing and communicating with the grooves through the hollow mandrel.

Due to this, the extruded inner wall does not retract from the additional mandrel until it stabilizes and has uniform change of the internal pressure, thus the smoothness of the inner wall being ensured.

Other distinguishing features of the present invention are as follows:

said plurality of grooves on the outer lateral surface of the additional mandrel can have at least one annular distributing groove connected to said vacuum source, and a number of helical grooves communicating with said annular groove;

said plurality can have at least two annular distributing grooves, one of which is axially most remote from and one of which is axially most close to the extrusion orifice, said annular grooves being connected to said vacuum source independently, and can have at least two groups of helical grooves communicating respectively with said annular grooves in such a manner that the groups are communicated with said vacuum source independently to ensure possibility of varying the intensity of vacuum pressure along the additional mandrel.

It should be noted that it is also known in the art of thermoplastic single-walled pipes manufacturing to use a cooled mandrel (see, for example, U.S. Pat. Nos. 3,907,961 and 4,663,107 for smooth pipes and U.S. Pat. No. 4,365,948 for ribbed pipes). Similarly, the teaching of the present invention is applicable to such a production as well.

A more complete appreciation of the present invention and the distinguishing characteristics, objectives and attendant advantages thereof set out herein is more apparent and obvious to the ordinary skilled in the art from the following description, drawing and appended claims.

BRIEF DESCRIPTION OF THE DRAWING

The lone FIGURE is a longitudinal section of the present die with the additional mandrel shown in a partial section.

DESCRIPTION OF THE PREFERRED EMBODIMENT

Referring now to the drawing, the extrusion die of the present invention for an apparatus producing double-walled seamless plastic tubing includes an extrusion head 2, an elongate nozzle 3, a first hollow mandrel 4, a second hollow mandrel 5 and an additional cooled and vacuumed mandrel.

The extrusion head 2 has a central bore with a lateral opening 6 for fluid communication with a first extruder means (not shown) and for receiving a first extrudate of a first thermoplastic material under pressure therefrom.

The nozzle 3 is of a conventional design and has a flange 8 in its receiving end for clamping the nozzle to the head 2 by means of a ring 9 with screws 10 disposed circumferentially around the flange 8.

To mount the nozzle 3 uniformly spaced around the first mandrel 4, the head 2 is provided with conventional centering screws (not shown) disposed radially in the head, interacting with the lateral surface of the flange 8 and permitting thus the radial adjustment of the nozzle 3 with respect to the mandrel 4.

The free end of the nozzle 3 has a first outer die lip 13.

The first mandrel 4 is placed in the bore of the head 2 in a substantially coaxial relation with and spaced from the nozzle 3 to provide a first thermoplastic conducting passage extending in the longitudinal direction thereof for the delivery of the first extrudate to the delivery end thereof. The mandrel 4 is clamped to a face of the head 2 by means of a broad flange 17 with screws 18 circumferentially disposed in the flange. The latter is provided with a lateral opening 21 for fluid communication with a second extruder means (not shown) and for receiving a second extrudate of a second thermoplastic material under pressure therefrom.

The second mandrel 5 is placed within the first mandrel 4 in a substantially coaxial relation with and spaced from the latter to provide a second thermoplastic conducting passage extending in the longitudinal direction thereof for the delivery of the second extrudate to the delivery end thereof. The mandrel 5 is clamped to a face of the flange 17 by means of a flange 22 and circumferentially disposed screws 23.

The lateral surfaces of the mandrels 4 and 5 have curved slots 24 and 26 respectively, to which the openings 6 and 21 are tangential to provide gradual transitions to the thermoplastic conducting passages.

The delivery end of the mandrel 4 carries a first inner die lip 27 and a second outer die lip 33. The free end of the second hollow mandrel 5 carries the additional mandrel having a second inner die lip 43, and outer sleeve 51 sheathing a grooved tube 52 and being supported by a disk 53 with a fastener 54. The grooves are substantially annular and form channels connected to a coolant discharge and a coolant supply. The discharge and supply are located exteriorly of the die with their lines connected to ports 55 and passing through an orifice 56 into the cavity of the mandrel 5 (the lines are not shown).

The mandrels 4 and 5 are provided with several ports 57 for pressurized air (in a blow-molding mode of operation) and communication lines for heater bands and thermal couples (not shown).

The lateral surface of the sleeve 51 has a plurality of annular distributing grooves 58, 59, 60 and 61, and groups 62 and 63 of helical grooves. The helical grooves of each group communicate with a vacuum source (not shown) independently via corresponding annular distributing grooves provided with ports 70 for vacuum lines (not shown) in the orifice 56 and the cavity of the mandrel 5, only one port 70 being shown in section. Since the groups 62 and 63 communicate with the externally located vacuum source independently, the intensity of applying vacuum along the sleeve 51 can be easily varied.

Because herein the novel feature is the cooled and vacuumed mandrel applicable to all the above known dies for single- and double-walled pipes, and for the sake of simplicity, conventional details (such as heaters, thermal couples, fasteners, centering means, etc.) are either not shown, or are simplified for clarity. Also, a person skilled in the art can substitute some shown features with their equivalents. For example, a conventional spider can be used instead of ports 57, the mandrels can be made of several parts fastened together and so on.

For production of corrugated tubing, the nozzle and mandrels of the die are placed in a tubular mold cavity formed by a series of forwardly moving molds 71 (shown conditionally along with an outer wall 72 and an inner wall 73 of the produced double-walled corrugated pipe). Such a design is described, for example, in already mentioned U.S. Pat. Nos. 3,976,414 and 4,510,013; and for ribbed pipes—in U.S. Pat. No. 4,365,948.

In operation, the extrudates of the expandable thermoplastic materials flow from the extruders uninterruptedly through the passages between the nozzle 3, mandrels 4 and 5. In the blow-molding mold, pressurized air is introduced through the ports 57 to the interior of the formed outer parison conforming to the wall of the tubular mold cavity under the air pressure. The additional mandrel receives the formed inner parison, urges the walls together and extracts heat from the inner wall, the inner smooth tube being fused to the inside of the corrugations of the outer tube.

In the vacuum molding mode, the molds have channels communicating with a vacuum pump, the pressure in said interior being atmospheric or from an air pressure supply (in a combination blow-vacuum molding mode).

The vacuum maintained between the sleeve 51 and the inner wall 73 does not allow the latter to retract from the former until the wall is set.

It is to be understood that the die described and presented is only exemplary and for explanation. Various modifications may be obviously resorted to by those skilled in the art without departing from the spirit and the scope of the present invention as set forth in the appended claims.

We claim:

1. An extrusion die for an apparatus producing seamless thermoplastic tubing, the die including:
   an extrusion head having a central bore with at least one opening for receiving an extrudate of a thermoplastic material under pressure therefrom;
   a nozzle attached to said head and carrying an outer die lip on a free end of the nozzle;
   a hollow mandrel placed in said bore in a substantially coaxial relation with and spaced from the nozzle to provide a thermoplastic conducting passage extending in the longitudinal direction thereof for the delivery of the extrudate to the delivery end thereof carrying an inner die lip defining with the outer die lip an annular extrusion orifice of diminishing interior dimensions, through which the extrudate can flow uninterruptedly and form the tubing;
   an additional mandrel mounted coaxially with the hollow mandrel, downstream thereof, for urging the tubing outwardly and extracting heat from the latter by means of a plurality of internal channels cooling an outer surface of the additional mandrel receiving the tubing from the extrusion orifice, said channels being connected to a coolant discharge and a coolant supply located exteriorly of the die and communicating with said channels through the additional hollow mandrel;
   a plurality of grooves on said outer surface of the additional mandrel, the grooves being connected to a vacuum source located exteriorly of the die and communicating with the grooves through the hollow mandrel, wherein said plurality has at least two annular distributing grooves, one of which is axially most remote from and one of which is axially most close to the extrusion orifice, said annular grooves being connected to said vacuum source independently, and has at least two groups of helical grooves communicating respectively with said annular grooves in such a manner that the groups are communicated with said vacuum source independently to ensure the possibility of varying the intensity of vacuum pressure along the additional mandrel.

* * * * *